US012753036B2

(12) United States Patent
Namiki

(10) Patent No.: US 12,753,036 B2
(45) Date of Patent: Oct. 6, 2026

(54) MEDIUM CONVEYANCE DEVICE AND IMAGE READING DEVICE

(71) Applicant: SEIKO EPSON CORPORATION, Tokyo (JP)

(72) Inventor: Masaki Namiki, Kitakyushu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/066,545

(22) Filed: Feb. 28, 2025

(65) Prior Publication Data

US 2025/0280078 A1 Sep. 4, 2025

(30) Foreign Application Priority Data

Mar. 1, 2024 (JP) ................................ 2024-031491

(51) Int. Cl.
*B65H 29/60* (2006.01)
*H04N 1/00* (2006.01)

(52) U.S. Cl.
CPC ......... *B65H 29/60* (2013.01); *H04N 1/00575* (2013.01); *H04N 1/00615* (2013.01); *H04N 1/00702* (2013.01); *B65H 2405/1115* (2013.01); *B65H 2801/39* (2013.01)

(58) Field of Classification Search
CPC ........ B65H 29/60; B65H 29/62; B65H 69/62; B65H 2301/544; B65H 2801/39; B65H 2405/1115; B65H 2405/11151; B65H 2405/1117; H04N 1/00575; H04N 1/00631; H04N 1/00588; H04N 1/0057
See application file for complete search history.

(56) References Cited

U.S. PATENT DOCUMENTS 5,996,995 A * 12/1999 Kim ........................ B65H 29/60 271/9.13
8,152,163 B2 * 4/2012 Kitan ..................... B65H 29/70 271/221
2024/0359938 A1 * 10/2024 Ogawa ................... B65H 29/60

FOREIGN PATENT DOCUMENTS

JP 2023016058 A 2/2023

* cited by examiner

*Primary Examiner* — Jeremy R Severson
(74) *Attorney, Agent, or Firm* — CHIP LAW GROUP

(57) ABSTRACT

A medium conveyance device has an exterior and includes a conveyance unit configured to convey a medium in a conveyance direction from a front surface side of the exterior, a straight path through which the medium is conveyed toward a back surface of the exterior, a U-turn path branched from the straight path and through which the medium is conveyed in a reversed manner, and a discharge port through which the medium is discharged from the straight path, and disposed at a back surface side of the exterior, in which the discharge port is positioned at a front surface side relative to a position of a back surface of the exterior corresponding to a region where the U-turn path is disposed.

8 Claims, 9 Drawing Sheets

MEDIUM CONVEYANCE DEVICE AND IMAGE READING DEVICE

The present application is based on, and claims priority from JP Application Serial Number 2024-031491, filed Mar. 1, 2024, the disclosure of which is hereby incorporated by reference herein in its entirety.

BACKGROUND

1. Technical Field

The present disclosure relates to a medium conveyance device and an image reading device.

2. Related Art

Examples of this type of device include a device described in JP-A-2023-16058.

JP-A-2023-16058 describes a sheet conveyance device including a U-turn conveyance path, a straight conveyance path, and a switching unit.

In the sheet conveyance device described in JP-A-2023-16058, a sheet of paper discharged from the straight conveyance path is discharged to a paper output tray positioned at the back surface side of the device. The paper output tray is provided openably/closably by rotating with a base end as a fulcrum, and is brought into an open state when in use and into a closed state when not in use. With this structure, the installation area in the depth direction of the entire device increases when the paper output tray is in an open state.

In a configuration in which the paper output tray is omitted, the device back surface can be disposed close to the wall surface of the installation place, but the sheet of paper discharged from the straight conveyance path easily collides with the wall surface, and a jam occurs.

SUMMARY

In order to solve the above problem, a medium conveyance device according to the present disclosure is a medium conveyance device having an exterior, the medium conveyance device including a conveyance unit configured to convey a medium in a conveyance direction from a front surface side of the exterior, a straight path through which the medium is conveyed toward a back surface of the exterior, a U-turn path branched from the straight path and through which the medium is conveyed in a reversed manner, and a discharge port through which the medium is discharged from the straight path and that is disposed at a back surface side of the exterior, in which the discharge port is positioned at a front surface side relative to a position of a back surface of the exterior corresponding to a region where the U-turn path is disposed.

An image reading device according to the present disclosure includes the medium conveyance device according to any one of the first to ninth aspects described later, and a reading unit configured to read an image from the medium conveyed by the medium conveyance device.

DESCRIPTION OF EMBODIMENTS

Figure 1:
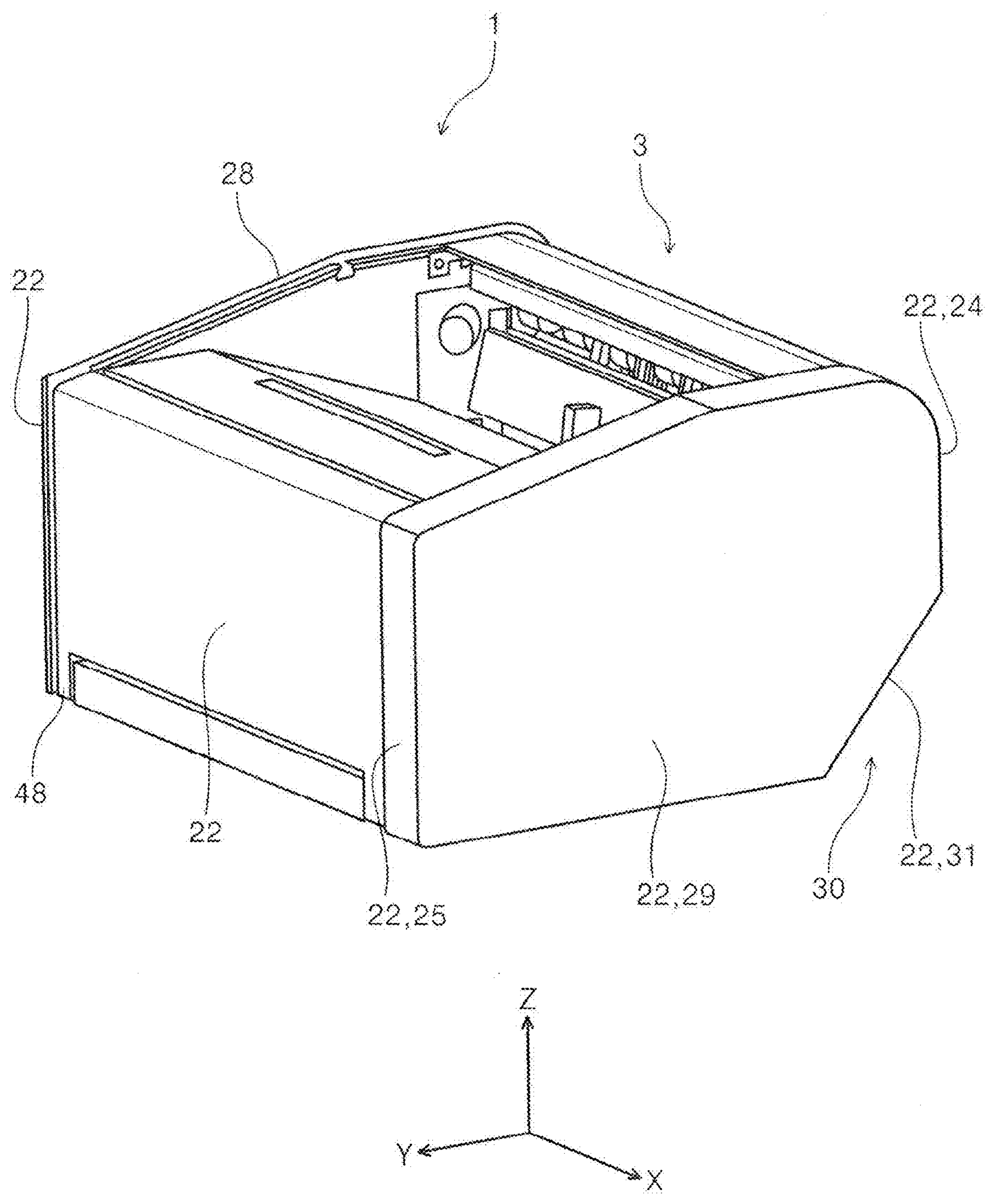
FIG. 1 is a front perspective view of a medium conveyance device according to Embodiment 1.

First, the present disclosure is schematically described below.

A medium conveyance device according to a first aspect of the present disclosure is a medium conveyance device having an exterior, the medium conveyance device including a conveyance unit configured to convey a medium in a conveyance direction from a front surface side of the exterior, a straight path through which the medium is conveyed toward a back surface of the exterior, a U-turn path branched from the straight path and through which the medium is conveyed in a reversed manner, and a discharge port through which the medium is discharged from the straight path and disposed at a back surface side of the exterior, in which the discharge port is positioned at a front surface side relative to a position of a back surface of the exterior corresponding to a region where the U-turn path is disposed.

Here, the "exterior" in the "medium conveyance device having an exterior" means a part constituting the external appearance of the medium conveyance device in the description of the present application. That is, the "exterior" in the description of the present application is not limited to one that covers the inside of a housing or the like, and for example, in a device in which the discharge port is exposed to form a part of the external appearance, the discharge port also is a part constituting the external appearance and is included in the exterior.

According to the present aspect, the discharge port disposed at the back surface side of the exterior, the discharge port through which the medium is discharged from the straight path is positioned at the front surface side relative to the position of the back surface of the exterior corresponding to the region where the U-turn path is disposed. Due to this, even in a state where the back surface of the medium conveyance device, that is, the back surface of the part of the U-turn path is installed close to the wall surface of the installation place, a space is formed between the discharge port and the position of the wall surface. It is possible to use this space as a region for receiving the medium discharged from the discharge port, whereby it is possible to reduce the possibility that the medium discharged from the straight path collides with the wall surface.

Since the paper output tray is not provided at the device back surface openably/closably unlike in the known case, the installation area in the depth direction of the entire device can be reduced.

A medium conveyance device according to a second aspect of the present disclosure is an aspect dependent at the first aspect, in which with respect to a depth dimension between the front surface and the back surface in side view of the exterior corresponding to the region where the U-turn path is disposed, a depth dimension between the front surface and the discharge port in side view of the exterior corresponding to a region where the straight path is disposed is short.

According to the present aspect, the medium conveyance device is configured in a relationship where a depth dimension between the front surface and the discharge port in side view of the exterior of the part corresponding to the straight path is shorter than a depth dimension between the front surface and the back surface in side view of the exterior of a part corresponding to the U-turn path. This enables a discharge region suitable for the medium to be secured by setting a difference between both of the depth dimensions in consideration of the size of the medium to be discharged from the discharge port.

A medium conveyance device according to a third aspect of the present disclosure is an aspect dependent at the first aspect, in which a discharge region where the medium is discharged from the discharge port is present below the U-turn path.

Note that the present aspect can also be dependent at the second aspect.

Here, the “discharge region” is a region formed by a back surface of a part at which the discharge port is positioned at a lower side of the exterior corresponding to the region where the U-turn path is disposed.

According to the present aspect, a discharge region where the medium is discharged from the discharge port is present below the U-turn path. This enables the medium to be discharged to the discharge region without providing a discharge tray or the like for discharging the medium.

A medium conveyance device according to a fourth aspect of the present disclosure is an aspect dependent at the third aspect, in which the discharge region includes an access portion at least one of left and right side surface portions of the exterior, and the discharge region is configured to be accessed from a side via the access portion.

Here, “configured to be accessed” means that the medium discharged to the discharge region is opened so that the user can take out the medium by hand. Therefore, the shape of the access portion is not limited to a specific shape.

According to the present aspect, the discharge region is configured to be accessed from a side to the discharge region via the access portion provided at the side surface portion of the exterior. This enables the user to easily take out the medium discharged to the discharge region.

A medium conveyance device according to a fifth aspect of the present disclosure is an aspect dependent at the fourth aspect, in which a part to be a back surface of the side surface portion is formed with an inclination portion inclined from a position to be the back surface of the U-turn path toward the front surface side, and the access portion is formed by the inclination portion.

According to the present aspect, a part to be a back surface of the side surface portion is formed with an inclination portion inclined from a position to be the back surface of the U-turn path toward the front surface side, and the access portion is formed by the inclination portion. This brings the discharge port into a state of being hidden from the side surface direction, and therefore it is possible to reduce the possibility of inadvertent contact by the user. The access portion can be provided with a simple structure.

A medium conveyance device according to a sixth aspect of the present disclosure is an aspect dependent at the third aspect, further including a sensor configured to detect a state of the medium in the discharge region. Note that the present aspect can also be dependent at the fourth aspect or the fifth aspect.

According to the present aspect, since a sensor configured to detect a state of the medium in the discharge region is included, the accumulation amount of the medium discharged to the discharge region can be monitored, and the user can easily judge the timing of taking out the medium having been accumulated. It is possible to easily grasp an inappropriate state such as a case where the medium is clogged in the discharge region or a case where a load state is disturbed.

A medium conveyance device according to a seventh aspect of the present disclosure is an aspect dependent at the third aspect, further including a guide unit in a discharge direction of the discharge port, in which the medium discharged from the discharge port is guided by the guide unit and discharged downward from the discharge port.

Note that the present aspect can also be dependent at any one of the fourth aspect to the sixth aspect.

According to the present aspect, the medium discharged from the discharge port is guided by the guide unit and discharged downward from the discharge port. This can stabilize the load state of the medium accumulated in the discharge region.

A medium conveyance device according to an eighth aspect of the present disclosure is an aspect dependent at the third aspect, further including a medium reception unit configured to receive a medium discharged from the discharge port, in which the medium reception unit is formed in a size fitting in the discharge region in a direction of the straight path.

Note that the present aspect can also be dependent at any one of the fourth aspect to the seventh aspect.

According to the present aspect, a medium reception unit configured to receive a medium discharged from the discharge port is included. Due to this, the medium having been discharged is placed on the medium reception unit and does not need to be placed on another member such as a table, the medium having been discharged is safe without scattering. Since the medium reception unit is formed in a size fitting in the discharge region in a direction of the straight path, there is little possibility of interference with the wall surface.

A medium conveyance device according to a ninth aspect of the present disclosure is an aspect dependent at the eighth aspect, in which the medium reception unit includes an inclination surface inclined toward a side from a top portion.

According to the present aspect, the medium reception unit includes an inclination surface inclined toward a side from a top portion. This makes the medium discharged to the medium reception unit easily move down the inclination surface toward the side, and the user can more easily take out the medium.

An image reading device according to a tenth aspect of the present disclosure includes the medium conveyance device according to any one of the first to ninth aspects, and a reading unit configured to read an image from the medium conveyed by the medium conveyance device.

According to the present aspect, the image reading device can achieve effects similar to the effects according to any one aspect of the first aspect to the ninth aspect.

EMBODIMENTS

Hereinafter, embodiments of a medium conveyance device and an image reading device according to the present disclosure will be specifically described with reference to FIGS. 1 to 9.

In the following description, three axes that are orthogonal to one another are referred to as an X axis, a Y axis, and a Z axis, respectively, as illustrated in each of the drawings. Directions indicated by arrows of the three axes (X, Y, and Z) are +directions of the respective directions, and opposite directions are −directions. The Z axis direction corresponds to a vertical direction, that is, a direction in which gravity acts, the +Z direction indicates a vertically upward direction, and the −Z direction indicates a vertically downward direction. The X axis direction and the Y axis direction correspond to horizontal directions. The +Y direction indicates a front direction of the image reading device, and the −Y direction indicates a rear direction of the image reading device. The +X direction indicates a right direction of the device, and the −X direction indicates a left direction of the device.

Overall Configuration of Image Reading Device

First, an overall configuration of an image reading device 1 of the present embodiment will be described with reference to FIGS. 1 to 3. The image reading device 1 of the present embodiment is a document scanner configured to read an image from a medium 2. Here, the image means an image visually recorded in the medium 2, and is, for example, a character, a figure, a table, a picture, a photograph, or the like. The medium is not limited to a sheet, and also includes a card and a booklet. The image reading device 1 is not limited to a scanner, and may be a copying machine, a facsimile machine, or the like.

The image reading device 1 includes a medium conveyance device 3 configured to convey the medium 2 in a conveyance direction F along a conveyance path 5, and a reading unit 4 configured to read an image from the medium 2 conveyed by the medium conveyance device 3. As illustrated in FIG. 3, in the present embodiment, two first reading units 41 and two second reading units 42 are included as the reading unit 4 configured to read an image from the medium 2. The first reading unit 41 is positioned at an upper side of the conveyance path 5 and reads an image of a first surface of the medium 2. The second reading unit 42 is positioned at a lower side of the conveyance path 5 and reads an image of a second surface opposite to the first surface. The reading unit 4 includes, for example, a contact image sensor (CIS) type sensor extending along the X axis, or a charge coupled device (CCD) type sensor.

A first rotation member 43 is disposed at a position facing the first reading unit 41, and a second rotation member 44 is disposed at a position facing the second reading unit 42. The first rotation member 43 and the second rotation member 44 each have a background portion not illustrated that is disposed at peripheral surfaces thereof. As the background portion, a white background portion and a black background portion are included at different positions. When the first reading unit 41 and the second reading unit 42 read an image from the medium 2, the first rotation member 43 and the second rotation member 44 are rotated by a drive source not illustrated to position the white background portion or the black background portion so as to face the reading positions of the first reading unit 41 and the second reading unit 42, respectively.

Furthermore, a conveyance unit 11 configured to convey the medium 2 in the conveyance direction F along the conveyance path 5 is further included. As the conveyance unit 11, a first conveyance roller pair 6 provided upstream of the first reading unit 41, a second conveyance roller pair 7 provided upstream of the second reading unit 42 positioned downstream of the first reading unit 41, and a third conveyance roller pair 8 provided downstream of the second reading unit 42 are included.

The first conveyance roller pair 6, the second conveyance roller pair 7, and the third conveyance roller pair 8 are each configured by a pair of a driving roller and a driven roller that rotate by power of a drive source not illustrated.

A roller pair of a feed roller 9 and a separation roller 10 is disposed upstream in the conveyance direction F of the first conveyance roller pair 6. The feed roller 9 is a driving roller that rotates by power of a drive source such as a motor not illustrated, and conveys the medium 2 toward the conveyance direction F.

The separation roller 10 is a driving roller that rotates by power of a drive source not illustrated, and is a roller that separates the medium from a plurality of the media 2 into one. Here, the separation roller 10 rotates in a direction of feeding the medium 2 to the upstream side (+Y direction) of the conveyance direction F by the power of the drive source. The separation roller 10 includes a torque limiter not illustrated, and when the torque limiter is applied with torque exceeding a set value, the separation roller 10 is driven to rotate in a direction of feeding the medium 2 to the downstream side (−Y direction) of the conveyance direction F.

A pick roller 12 is disposed upstream of the separation roller 10. The pick roller 12 is a driving roller that rotates by power of a drive source not illustrated, and picks and feeds the medium 2 toward the conveyance direction F.

Figure 3:
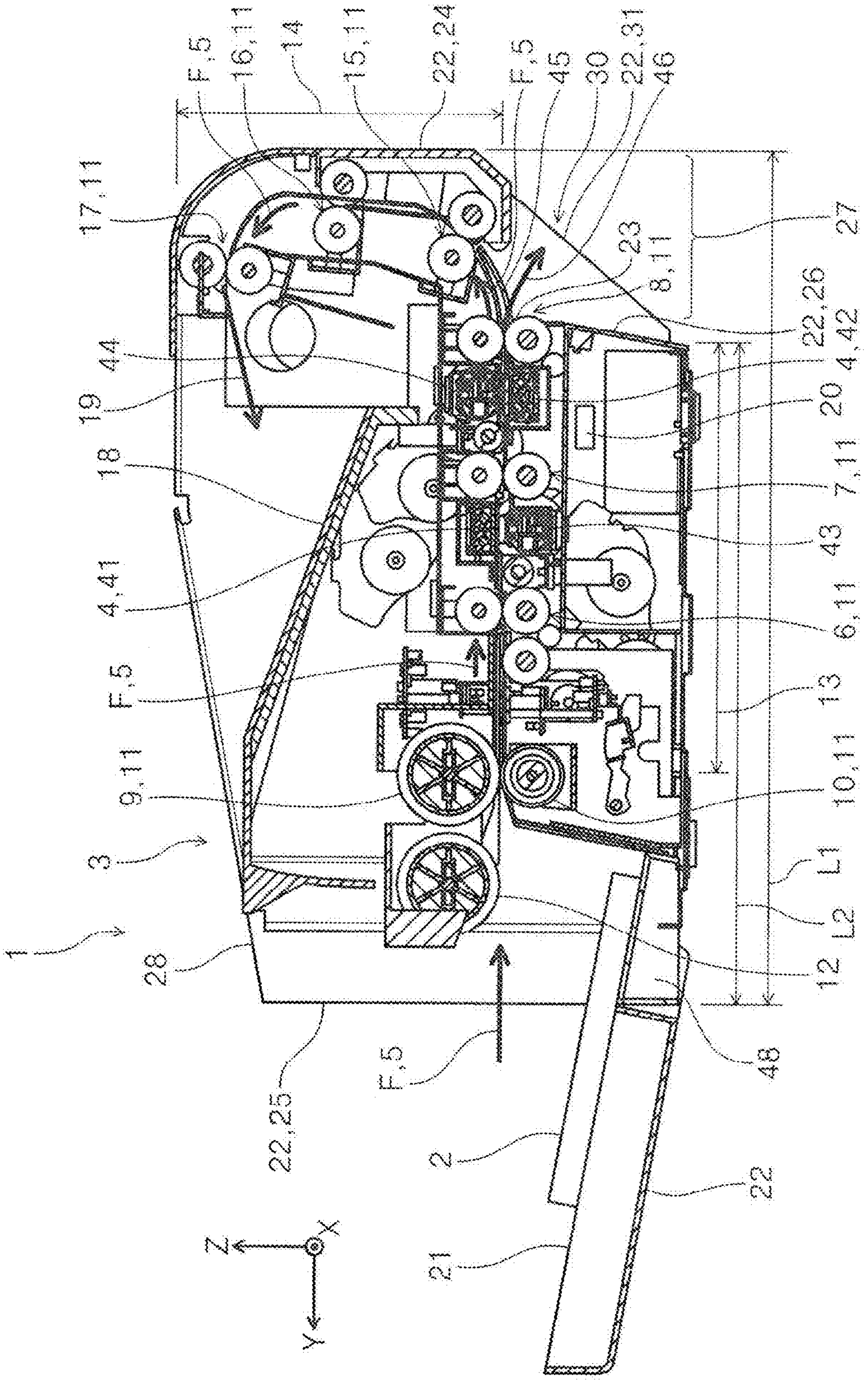
FIG. 3 is a side cross-sectional view of the medium conveyance device according to Embodiment 1.

As illustrated in FIG. 3, in the present embodiment, downstream of a straight path 13 from the feed roller 9 to the third conveyance roller pair 8, that is, downstream of the third conveyance roller pair 8 is provided with a U-turn path 14. At the U-turn path 14, a fourth conveyance roller pair 15, a fifth conveyance roller pair 16, and a discharge roller pair 17 as the conveyance unit 11 are arranged in this order along the conveyance direction F. The fourth conveyance roller pair 15, the fifth conveyance roller pair 16, and the discharge roller pair 17 are also each configured by a pair of a driving roller and a driven roller that rotate by power of a drive source not illustrated.

A discharged medium placement unit 18 configured to receive the medium 2 discharged from the discharge roller pair 17 in the direction of arrow 19 is disposed above the straight path 13 to achieve compactness.

In FIG. 3, reference numeral 21 denotes a medium setting unit configured to set the medium 2 that is a reading target. The medium setting unit 21 is configured to be opened/closed by rotating with the base end 48 as a rotation fulcrum. The medium setting unit 21 is used in the open state of FIG. 3. In FIG. 1, the medium setting unit 21 is in a closed state, and is configured to form a part of the exterior 22 in this closed state.

The medium 2 on the medium setting unit 21 is picked by the pick roller 12 and fed in the conveyance direction F. The medium setting unit 21 is configured to move up and down by power of a drive source not illustrated. When the medium 2 set at the medium setting unit 21 is fed in the conveyance direction F, first, power is transmitted from the drive source not illustrated to the medium setting unit 21 and the medium setting unit 21 is moved upward (+Z direction), and the medium 2 positioned at the uppermost position is stopped in a state of being in contact with the pick roller 12. When the pick roller 12 rotates in that state, the medium 2 is fed in the conveyance direction F, and a tip end of the medium 2 reaches a nip position of the roller pair of the feed roller 9 and the separation roller 10.

In a case of a multi-feed state in which a plurality of the media 2 are fed, the media 2 are separated into one sheet by the separation roller 10, the one sheet is conveyed in the conveyance direction F by the first conveyance roller pair 6, and the first reading unit 41 reads the image of the first surface of the medium 2.

Furthermore, the medium 2 read by the first reading unit 41 is conveyed by the second conveyance roller pair 7, and the second reading unit 42 reads the image of the second surface opposite to the first surface of the medium 2.

In FIG. 3, reference numeral 20 denotes a control unit. The control unit 20 controls the drive of the each drive source and the reading operation of the reading unit 4 in association with conveyance of the medium 2.

The control unit 20 includes a CPU, a flash ROM, and a RAM. The CPU performs various types of arithmetic processing according to programs stored in the flash ROM, and controls the entire operation of the image reading device 1. The flash ROM that is an example of a storage unit is a readable and rewritable nonvolatile memory. The RAM that is an example of a storage unit temporarily stores a variety of information.

Embodiment 1

Medium Conveyance Device

Following the description of the overall structure of the image reading device 1 described above, the medium conveyance device 3 of Embodiment 1 will be described below with reference to FIGS. 1 to 6 with some description partially overlapping the above.

The medium conveyance device 3 includes an exterior 22 constituting an external appearance. As illustrated in FIG. 3, the medium conveyance device 3 includes the conveyance unit 11 configured to convey the medium 2 in the conveyance direction F from the front surface side (+Y side) of the exterior 22, the straight path 13 through which the medium 2 is conveyed toward the back surface side of the exterior 22, and the U-turn path 14 branched from the straight path 13 via a direction switching unit 45, the U-turn path 14 through which the medium 2 is conveyed in a reversed manner.

Figure 4:
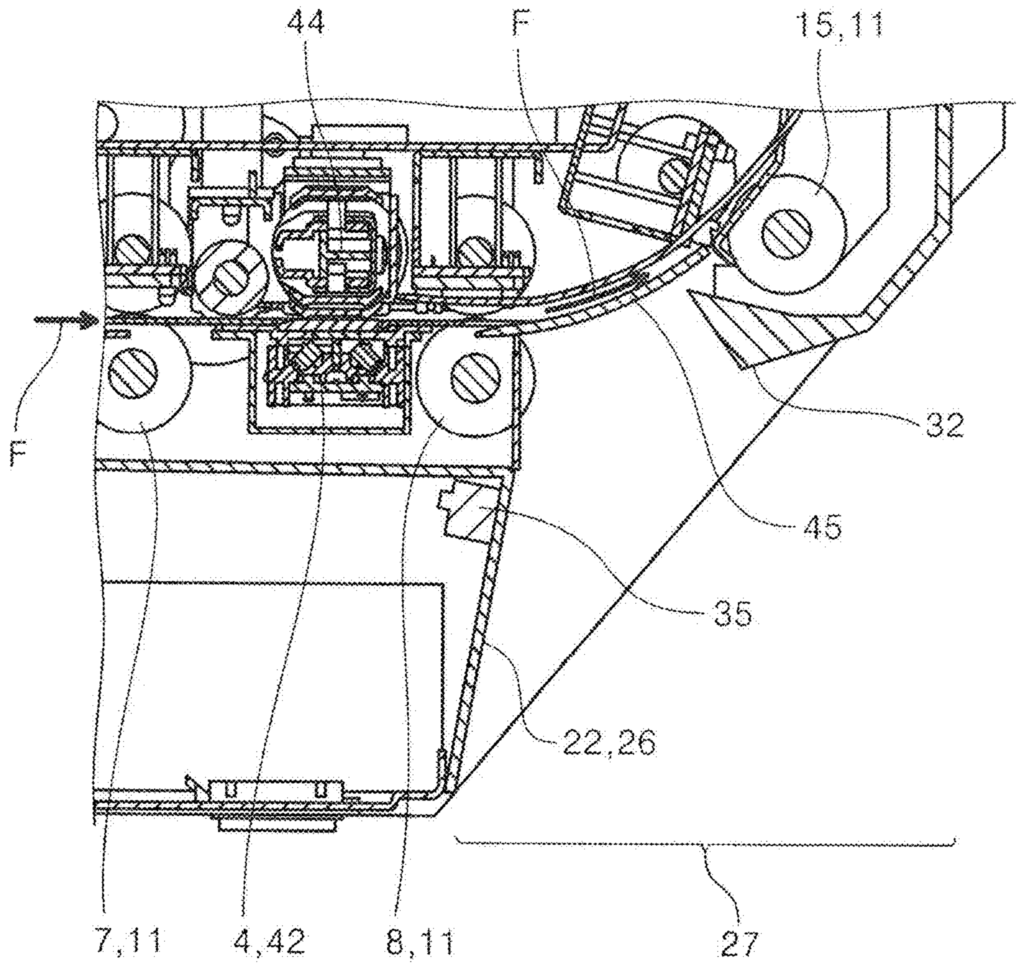
FIG. 4 is an enlarged view of a main part of FIG. 3.
Figure 5:
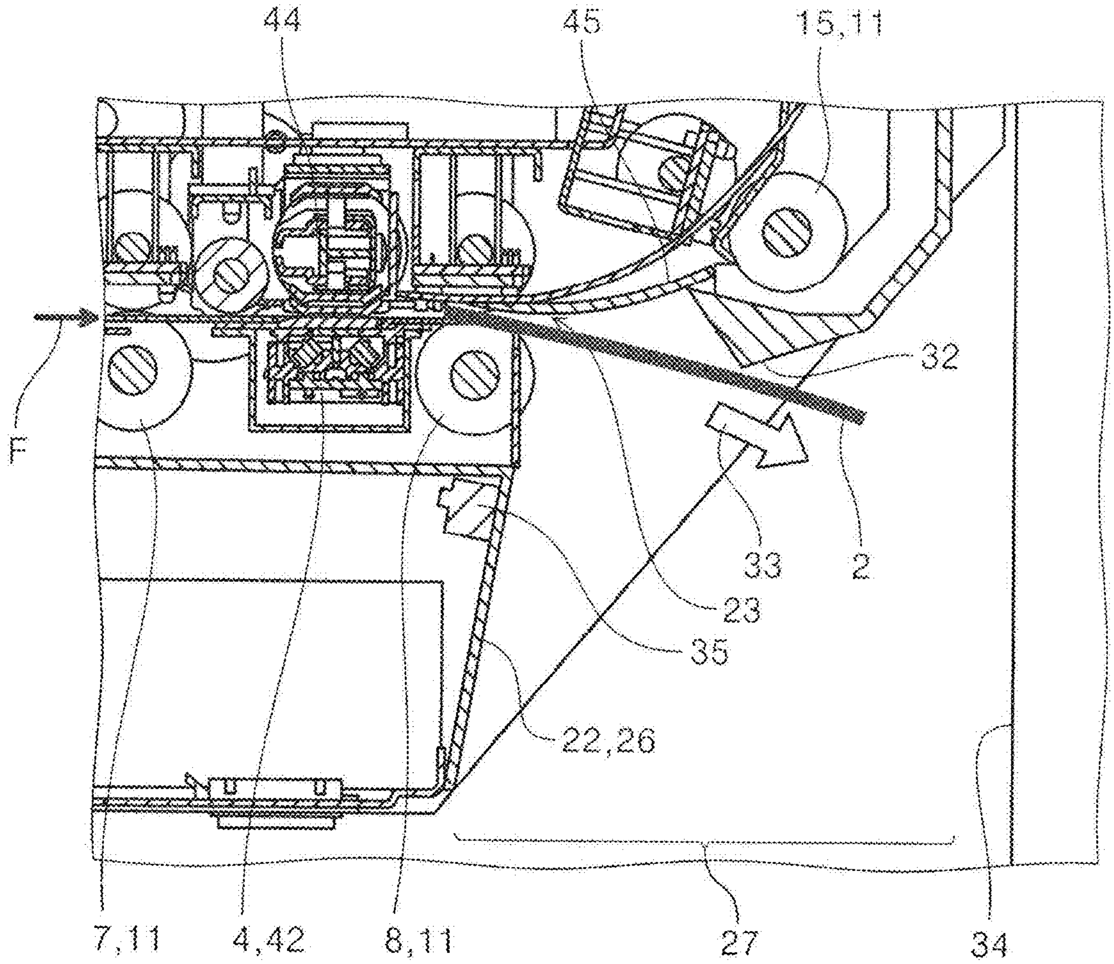
FIG. 5 is an enlarged view of a main part of FIG. 3.

The direction switching unit 45 is driven by the control unit 20 via a drive mechanism not illustrated, and takes the position of FIG. 4 and the position of FIG. 5. The medium 2 is guided in a direction of the U-turn path 14 when the direction switching unit 45 is at the position of FIG. 4, is guided in a direction of being discharged from a discharge port 23 when the direction switching unit 45 is at the position of FIG. 5, and is discharged in a direction of arrow 46.

The medium conveyance device 3 includes the discharge port 23 through which the medium 2 is discharged from the straight path 13. The discharge port 23 is disposed at the back surface side (−Y side) of the exterior 22. The discharge port 23 is configured to be positioned at the front surface side (+Y side) relative to the position of a back surface 24 of the exterior 22 corresponding to the region where the U-turn path 14 is disposed.

Note that in the description of the present application, the exterior 22 means a part constituting the external appearance of the medium conveyance device. That is, the exterior 22 in the description of the present application is not limited to one that covers the inside of the housing and the like, and for example, in a medium conveyance device in which the discharge port 23 is exposed to form a part of the external appearance, the discharge port is also a part constituting the external appearance and is included in the exterior 22.

The discharge port 23 is disposed as follows. As illustrated in FIG. 3, let a depth dimension between a front surface 25 and the back surface 24 in side view of the exterior 22 corresponding to the region where the U-turn path 14 is disposed be L1. Let a depth dimension from the front surface 25 to the discharge port 23 in side view of the exterior 22 corresponding to the region where the straight path 13 is disposed be L2. The depth dimension L2 corresponding to the position of the discharge port 23 is configured to be shorter than the depth dimension L1. Reference numeral 26 denotes a back surface at the back surface side (−Y side) corresponding to the discharge port 23.

By the difference (L1−L2) in the depth dimensions, a structure in which a discharge region 27 where the medium 2 is discharged from the discharge port 23 is present at a part below a back surface 26 where the discharge port 23 is exposed and the U-turn path 14 is achieved. The discharge region 27 is a region that is positioned at the lower side of the exterior 22 corresponding to the region where the U-turn path 14 is disposed, and is formed by the back surface 24 and the back surface 26 of the part where the discharge port 23 is positioned.

The difference (L1−L2) in the depth dimensions is set based at the size of the medium to be discharged to the discharge region 27. For example, it is set so that the medium 2 such as a business card or a credit card can be received. Alternatively, it is set so that the medium 2 having a size of a postcard can be received.

Figure 2:
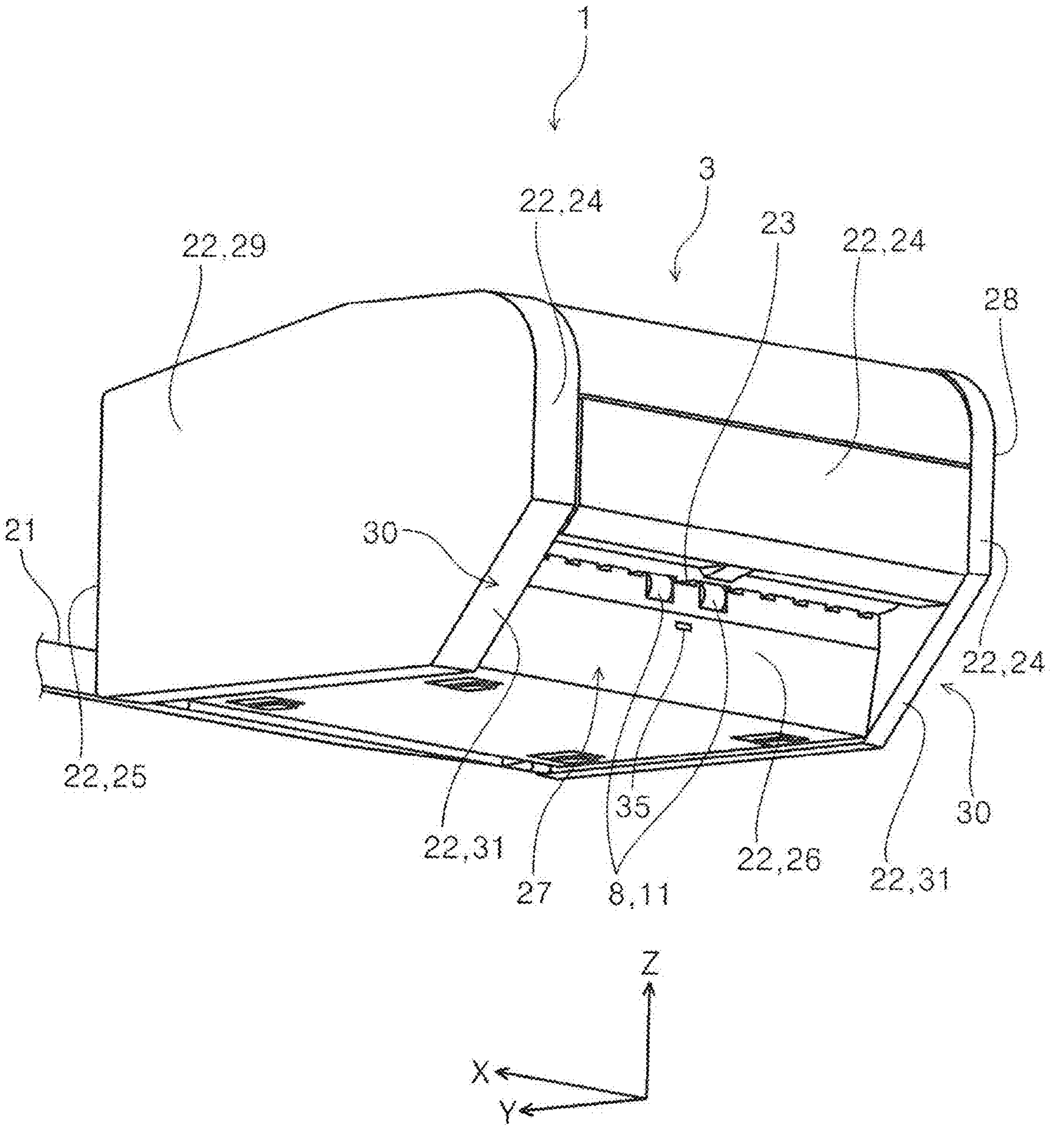
FIG. 2 is a rear perspective view of the medium conveyance device according to Embodiment 1.

As illustrated in FIGS. 1 to 3, in the present embodiment, the discharge region 27 includes an access portion 30 at least one of left and right side surface portions 28 and 29 of the exterior 22. The discharge region 27 is configured such that the user is accessible laterally (X axis direction) via the access portion 30. Being accessible means that the medium 2 discharged to the discharge region 27 is opened so that the user can take out the medium 2 by hand. Therefore, the shape of the access portion 30 is not limited to a specific shape.

In the present embodiment, the access portion 30 is configured as follows. The parts corresponding to the back surfaces of the side surface portions 28 and 29 are formed with an inclination portion 31 inclined from a position corresponding to the back surface 24 of the U-turn path 14 toward the front surface side (+Y side). The access portion 30 is formed by the inclination portion 31 provided in the parts corresponding to the back surfaces of the side surface portions 28 and 29.

As illustrated in FIG. 5, in the present embodiment, a guide unit 32 is included in the discharge direction of the discharge port 23. The medium 2 is configured to be discharged from the discharge port 23 is guided by the guide unit 32 and discharged downward from the discharge port 23, that is, in the direction of arrow 33. The guide unit 32 of the present embodiment is a protrusion portion protruding in the −Z direction. The guide unit 32 is disposed in the −Y direction relative to the discharge port 23. The −Z direction end portion of the protrusion portion of the guide unit 32 is positioned in the −Z direction relative to the discharge port 23.

In FIG. 5, reference numeral 34 denotes a wall surface. That is, even when the back surface 24 of the medium conveyance device 3 is placed at a position close to a wall surface 34 of the installation place, the medium 2 can be discharged into the discharge region 27 by being guided downward by the guide unit 32.

Figure 6:
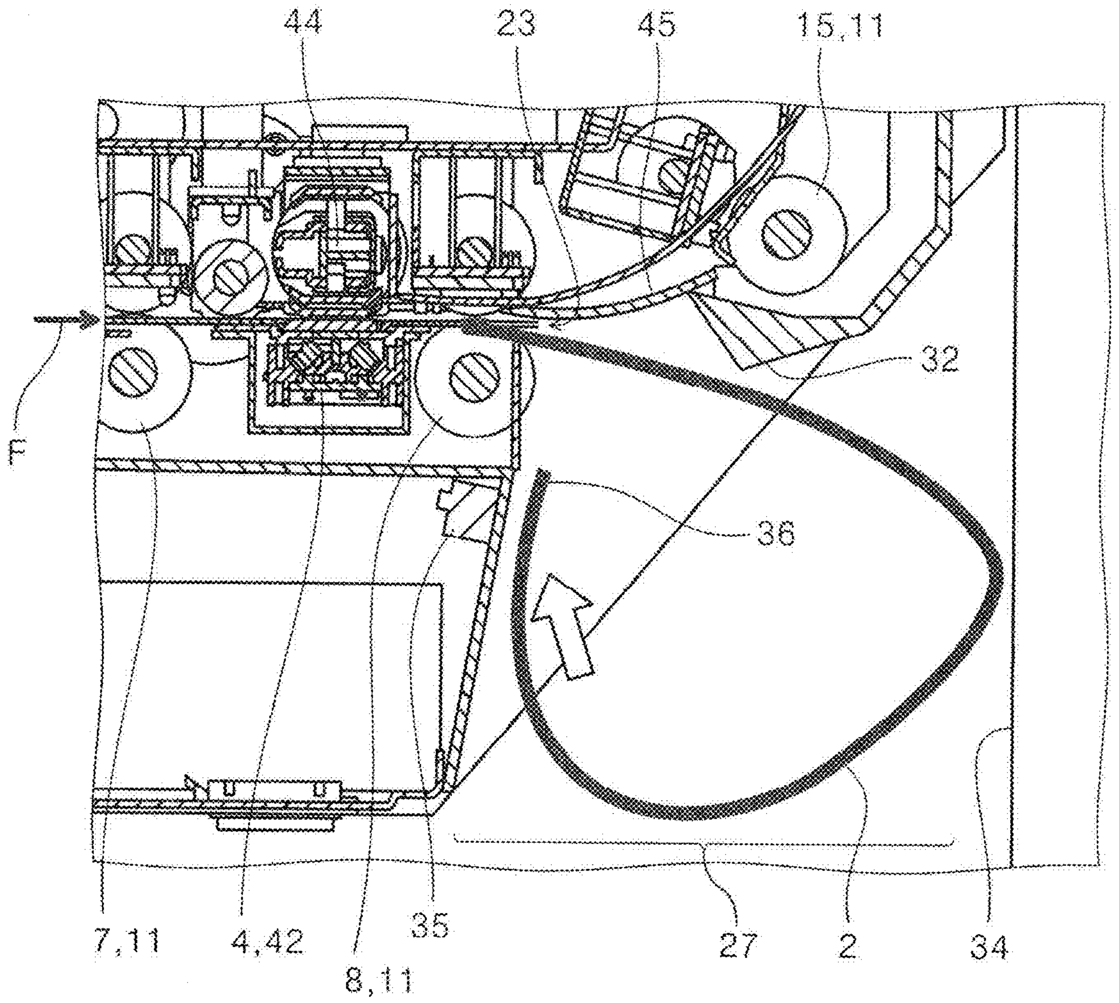
FIG. 6 is an enlarged view of a main part of FIG. 3.

As illustrated in FIG. 6, in the present embodiment, a sensor 35 configured to detect the state of the medium 2 in the discharge region 27 is included. Here, an optical sensor is used as the sensor 35, but the present disclosure is not limited to this, and may be any sensor that can detect the state of the medium 2 at the discharge region 27. The sensor 35 is disposed, for example, below the third conveyance roller pair 8 and at the center portion in the X axis direction of the back surface 26.

FIG. 6 illustrates a case where the medium 2 having a size not entering the discharge region 27 is discharged from the discharge port 23. This medium 2 is returned with a tip end portion 36 thereof being reversed by the wall surface 34, and the medium 2 further moves toward the discharge port 23 and is detected by the sensor 35. This notifies the user of the fact that the conveyance state is not in a normal conveyance state. That is, by light emitted from the sensor 35 being reflected by the tip end portion 36, it is detected that the conveyance state is not in a normal conveyance state. Note that a configuration in which a plurality of the sensors 35 are arranged may be adopted.

Modification

Figure 7:
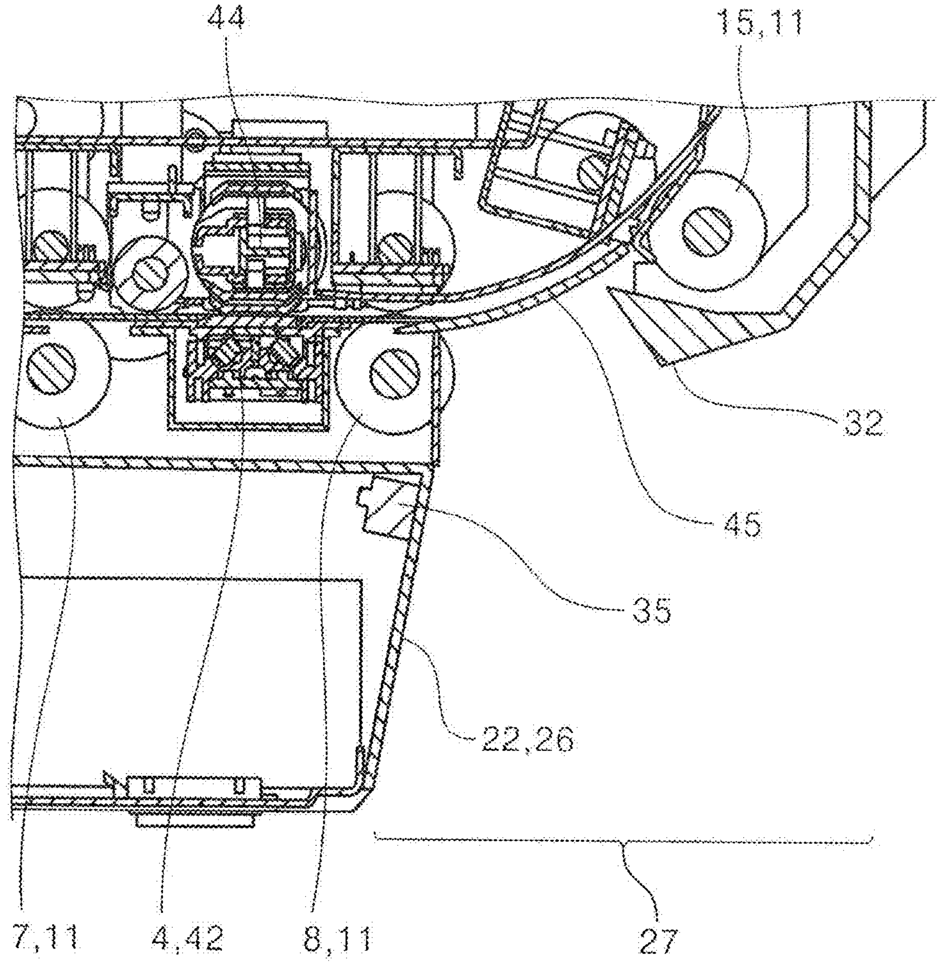
FIG. 7 is an enlarged side cross-sectional view of a main part of a medium conveyance device according to a modification of Embodiment 1.

In the above description, a case where the access portion 30 is formed by the inclination portion 31 provided in the parts corresponding to the back surfaces of the side surface portions 28 and 29 has been described. As illustrated in FIG. 7, the access portion 30 may have a structure in which the lateral part of the discharge region 27 is entirely opened.

With such an open structure, the user can more easily access the discharge region 27 from a side.

Description of Effects of First Embodiment (1) In the present embodiment, the discharge port 23 disposed at the back surface side (−Y side) of the exterior 22, the discharge port 23 through which the medium 2 is discharged from the straight path 13 is positioned at the front surface side (+Y side) relative to the position of the back surface 24 of the exterior 22 corresponding to the region where the U-turn path 14 is disposed. Due to this, even in a state where the back surface 24 of the medium conveyance device 3, that is, the back surface 24 of the part of the U-turn path 14 is installed close to the wall surface 34 (FIG. 5) of the installation place, a space is formed between the discharge port 23 and the position of the wall surface 34. It is possible to use this space as a region for receiving the medium 2 discharged from the discharge port 23, whereby it is possible to reduce the possibility that the medium 2 discharged from the straight path 13 collides with the wall surface 34.

Since the paper output tray is not provided at the device back surface openably/closably unlike in the known case, the installation area in the depth direction of the entire device can be reduced.

(2) In the present embodiment, the medium conveyance device is configured in a relationship where the depth dimension L2 between the front surface 25 and the discharge port 23 in side view of the exterior 22 of the part corresponding to the straight path 14 is shorter than the depth dimension L1 between the front surface 25 and the back surface 24 in side view of the exterior 22 in the part corresponding to the U-turn path 13. This enables the discharge region 27 suitable for the medium 2 to be secured by setting the difference (L1−L2) between both of the depth dimensions in consideration of the size of the medium 2 discharged from the discharge port 23.

(3) In the present embodiment, the discharge region 27 where the medium 2 is discharged from the discharge port 23 is present below the U-turn path 14. This enables the medium 2 to be discharged to the discharge region 27 without providing a discharge tray or the like for discharging the medium 2.

(4) In the present embodiment, the discharge region 27 is configured to be accessed from a side to the discharge region 27 via the access portion 30 provided at the side surface portions 28 and 29 of the exterior 22. This enables the user to easily take out the medium 2 discharged to the discharge region 27.

(5) In the present embodiment, the parts corresponding to the back surfaces of the side surface portions 28 and 29 are formed with an inclination portion 31 inclined from a position corresponding to the back surface 24 of the U-turn path 14 toward the front surface side (+Y side), and the access portion 30 is formed by the inclination portion 31. This brings the discharge port 23 into a state of being hidden from the side surface direction, and therefore it is possible to reduce the possibility of inadvertent contact by the user. The access portion 30 can be provided with a simple structure.

(6) In the present embodiment, since the sensor 35 configured to detect a state of the medium 2 in the discharge region 27 is included, the accumulation amount of the medium 2 discharged to the discharge region 27 can be monitored, and the user can easily judge the timing of taking out the medium 2 having been accumulated. It is possible to easily grasp an inappropriate state such as a case where the medium 2 is clogged in the discharge region 27 or a case where a load state is disturbed.

(7) In the present embodiment, the medium 2 discharged from the discharge port 23 is guided by the guide unit 32 and discharged downward from the discharge port 23. This can stabilize the load state of the medium 2 accumulated in the discharge region 27.

Embodiment 2

Figure 8:
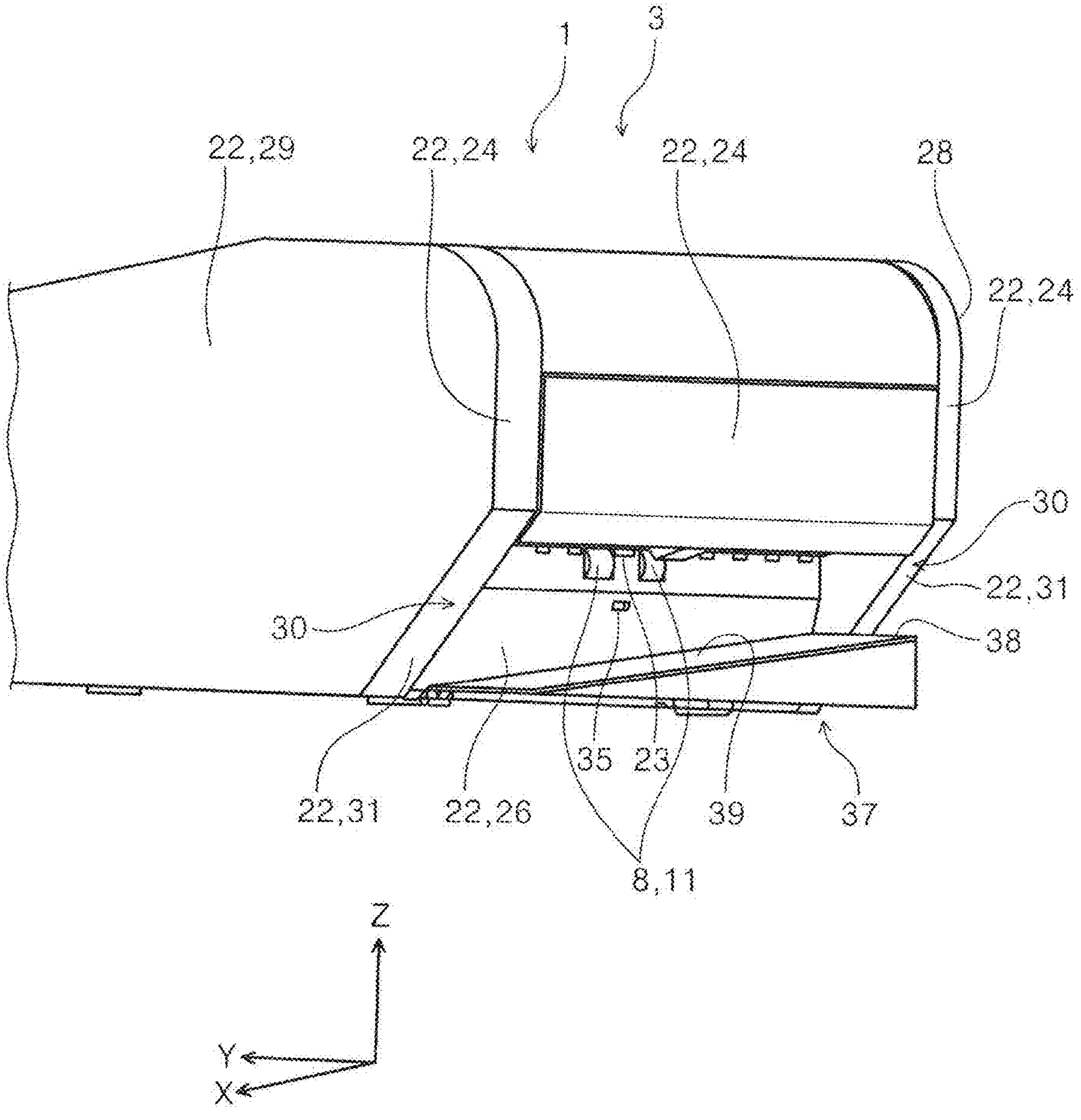
FIG. 8 is a rear perspective view of the medium conveyance device according to Embodiment 2.

Next, the medium conveyance device 3 according to Embodiment 2 will be described with reference to FIG. 8. The same parts as those in Embodiment 1 are denoted by the same reference numerals, and description of the configurations and corresponding effects are omitted. As illustrated in FIG. 8, in the present embodiment, a medium reception unit 37 configured to receive the medium 2 discharged from the discharge port 23 is included. Specifically, the discharge region 27 is provided at a position below the back surface 26 corresponding to the discharge port 23. That is, the medium reception unit 37 is provided in a size fitting within the discharge region 27.

Furthermore, as illustrated in FIG. 8, this medium reception unit 37 includes an inclination surface 39 inclined from a top portion 38 positioned at the side surface portion 28 side toward a side to the side surface portion 29 side.

For example, when the medium 2 having a size such as a business card is conveyed through the straight path 13 and discharged from the discharge port 23, the medium 2 is placed on the inclination surface 39 of the medium reception unit 37 positioned below. Then, the medium 2 slides down the inclination surface 39 to reach a part below the inclination portion 31.

In the present embodiment, the medium reception unit 37 configured to receive the medium 2 discharged from the discharge port 23 is included. Due to this, the medium 2 having been discharged is placed on the medium reception unit 37 and does not need to be placed on another member such as a table, the medium 2 having been discharged is safe without scattering. Since the medium reception unit 37 is formed in a size fitting in the discharge region 27 in the direction of the straight path 13, there is little possibility of interference with the wall surface 34.

The medium reception unit 37 includes the inclination surface 39 inclined toward a side from the top portion 38. This makes the medium 2 discharged to the medium reception unit 37 easily moves down the inclination surface 39 toward a side, and the user can more easily take out the medium 2.

Modification

Figure 9:
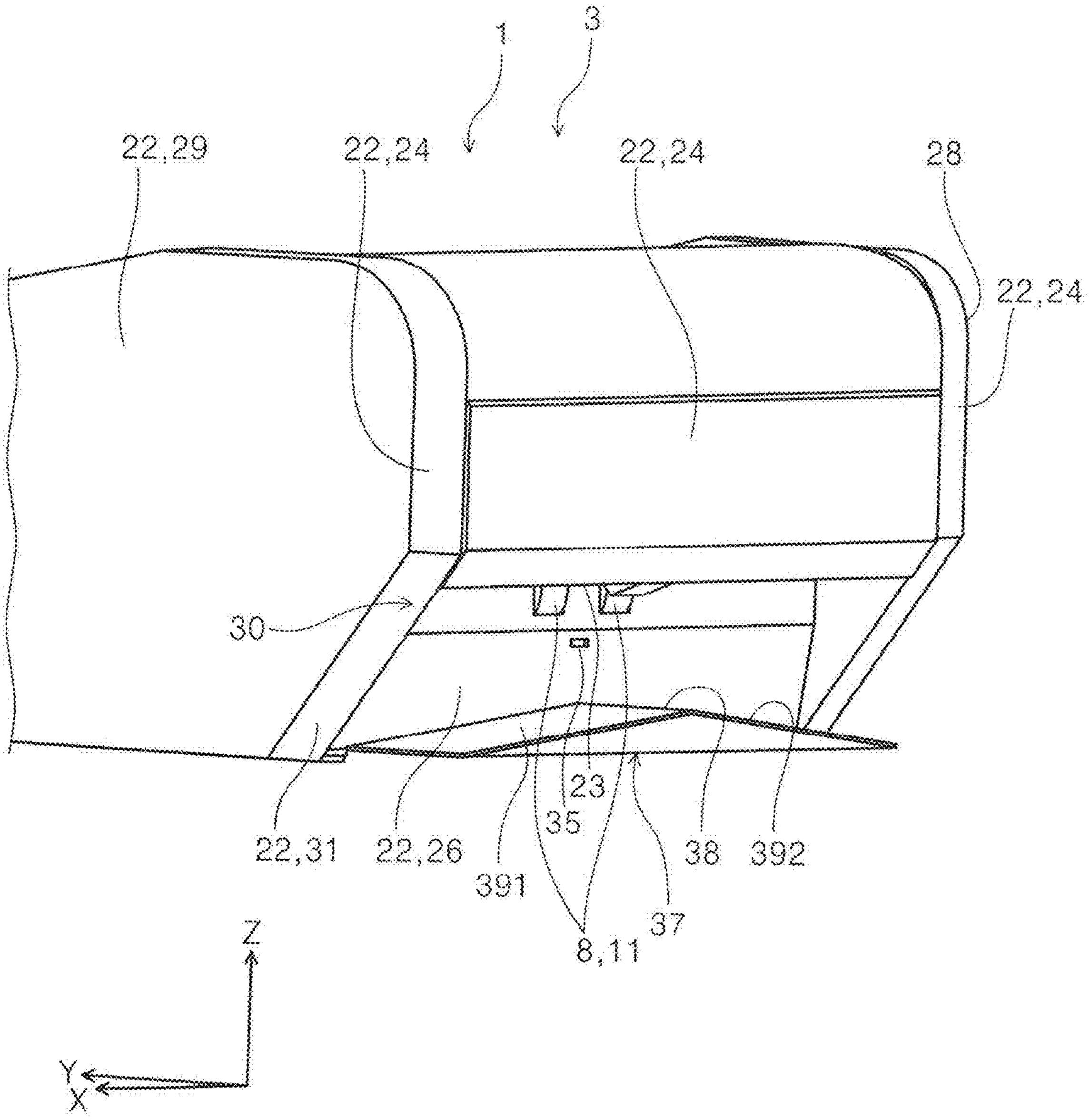
FIG. 9 is a rear perspective view of a medium conveyance device according to a modification of Embodiment 2.

In the above description, there is only one inclination surface 39, but as illustrated in FIG. 9, a first inclination surface 391 and a second inclination surface 392 may be provided at the left and right of the top portion 38. Since the effects thereof are basically the same as those in the description of Embodiment 2, the description thereof will be omitted.

OTHER EMBODIMENTS

The medium conveyance device 3 and the image reading device 1 according to the present disclosure are based at the configuration of the embodiments described above, but it is of course possible to change or omit partial configurations within the scope not departing from the gist of the disclosure of the present application.

In the above description, the case where the access portion 30 is provided at both the side surface portion 28 and the side surface portion 29 has been described, but the access portion 30 may be provided at either one of them.

The medium conveyance device 3 is configured to be mounted at a device other than the image reading device 1, and for example, is configured to be used by being mounted at a recording device such as an inkjet printer.

What is claimed is:

1. A medium conveyance device having an exterior, the medium conveyance device comprising:

a conveyance unit configured to convey a medium in a conveyance direction from a front surface side of the exterior;

a straight path through which the medium is conveyed toward a back surface of the exterior;

a U-turn path branched from the straight path and through which the medium is conveyed in a reversed manner; and a discharge port through which the medium is discharged from the straight path and disposed at a back surface side of the exterior, wherein the discharge port is positioned at the front surface side relative to a position of the back surface of the exterior corresponding to a region where the U-turn path is disposed, a discharge region where the medium is discharged from the discharge port is present below the U-turn path, the discharge region includes an access portion on at least one of a left side surface portion of the exterior or a right side surface portion of the exterior, and the discharge region is configured to be accessed from a side via the access portion.

2. The medium conveyance device according to claim 1, wherein with respect to a depth dimension between a front surface and the back surface in side view of the exterior corresponding to the region where the U-turn path is disposed, a depth dimension between the front surface and the discharge port in the side view of the exterior corresponding to a region where the straight path is disposed is short.

3. The medium conveyance device according to claim 1, wherein a part to be a back surface of the right side surface portion is formed with an inclination portion inclined from a position to be a back surface of the U-turn path toward the front surface side, and the access portion is formed by the inclination portion.

4. The medium conveyance device according to claim 1, further comprising a sensor configured to detect a state of the medium in the discharge region.

5. The medium conveyance device according to claim 1, further comprising a protrusion portion in a discharge direction of the discharge port, wherein the medium discharged from the discharge port is guided by the protrusion portion and discharged downward from the discharge port.

6. The medium conveyance device according to claim 1, further comprising a medium reception unit configured to receive the medium discharged from the discharge port, wherein the medium reception unit is formed in a size fitting in the discharge region in a direction of the straight path.

7. The medium conveyance device according to claim 6, wherein the medium reception unit includes an inclination surface inclined toward a side from a top portion.

8. An image reading device comprising:

the medium conveyance device according to claim 1; and an image sensor configured to read an image from the medium conveyed by the medium conveyance device.

* * * * *